(12) United States Patent
De Sapio et al.

(10) Patent No.: US 11,200,354 B1
(45) Date of Patent: Dec. 14, 2021

(54) SYSTEM AND METHOD FOR SELECTING MEASUREMENT NODES TO ESTIMATE AND TRACK STATE IN DYNAMIC NETWORKS

(71) Applicant: HRL Laboratories, LLC, Malibu, CA (US)

(72) Inventors: Vincent De Sapio, Westlake Village, CA (US); Kang-Yu Ni, Calabasas, CA (US); Tsai-Ching Lu, Thousand Oaks, CA (US)

(73) Assignee: HRL Laboratories, LLC, Malibu, CA (US)

(*) Notice: Subject to any disclaimer, the term of this patent is extended or adjusted under 35 U.S.C. 154(b) by 138 days.

(21) Appl. No.: 16/746,436

(22) Filed: Jan. 17, 2020

Related U.S. Application Data (60) Provisional application No. 62/875,195, filed on Jul. 17, 2019.

(51) Int. Cl.
  *G06F 30/18* (2020.01)
  *G06F 17/13* (2006.01)
  *G06F 111/10* (2020.01)

(52) U.S. Cl.
  CPC ............ *G06F 30/18* (2020.01); *G06F 17/13* (2013.01); *G06F 2111/10* (2020.01)

(58) Field of Classification Search
  None
  See application file for complete search history.

(56) References Cited

U.S. PATENT DOCUMENTS

| 10,997,352 B1* | 5/2021 | Posser ................... G06F 30/18 |
| 2003/0078918 A1* | 4/2003 | Souvignier ............ G06F 16/10 |
| 2008/0013533 A1* | 1/2008 | Bogineni .............. H04W 28/00 |
| | | 370/389 |

(Continued)

OTHER PUBLICATIONS

Kalman, R., 1959. On the general theory of control systems. IRE Transactions on Automatic Control, 4(3), pp. 110-110.

(Continued)

*Primary Examiner* — Craig C Dorais
(74) *Attorney, Agent, or Firm* — Tope-McKay & Associates (57) ABSTRACT

Described is a system for selecting measurement nodes in a distributed physical system of agents. In operation, the distributed physical system is represented as a multi-layer network having a communication layer and an agent layer. The communication layer represents the amount of collective communication activities between any pair of areas and the agent layer represents movement of agents within the distributed physical system such that the communication layer and agent layer collectively generate network dynamics. The network dynamics are modeled as hybrid partial differential equations (PDEs) with measurable interconnected states in the communication layer. Notably, placement of a minimum set of measurement nodes is determined within the distributed physical system to provide full-state observability of the distributed physical system. The system can then track the full system state and apply compensation to one or more agents in the distributed physical system based on tracking the full system state.

27 Claims, 9 Drawing Sheets

```
optimalSet = ∅
maxRank = 0
maxTestSet = ∅
for i = 1 → N do
   selectableSet = allNodes − optimalSet
   for j = 1 → |selectableSet| do
      testNode = selectableSet(j)
      testSet = optimalSet ∪ testNode
      form C(testSet)
      if rank(O(A, C)) ≥ maxRank
         maxRank = rank(O(A, C))
         maxTestSet = testSet
      end
   end
      optimalSet ← maxTestSet
      if maxRank = N
         return
      end
end
```

(56) References Cited

U.S. PATENT DOCUMENTS

2018/0332256 A1   11/2018   Ni et al.

OTHER PUBLICATIONS

Kalman, R.E., 1960. A new approach to linear filtering and prediction problems. Journal of basic Engineering, 82(1), pp. 35-45.
Kalman, R.E., 1963. Mathematical description of linear dynamical systems. Journal of the Society for Industrial and Applied Mathematics, Series A: Control, 1(2), pp. 152-192.
Liu, Y.Y., Slotine, J.J. and Barabási, A.L., 2011. Controllability of complex networks. Nature, 473(7346), pp. 167-173.
Liu, Y.Y., Slotine, J.J. and Barabási, A.L., 2013. Observability of complex systems. Proceedings of the National Academy of Sciences, 110(7), pp. 2460-2465.

\* cited by examiner

FIG. 6A    FIG. 6B $$optimalSet = \emptyset$$
$$maxRank = 0$$
$$maxTestSet = \emptyset$$
for $i = 1 \rightarrow N$ do
   $selectableSet = allNodes - optimalSet$
   for $j = 1 \rightarrow |selectableSet|$ do
      $testNode = selectableSet(j)$
      $testSet = optimalSet \cup testNode$
      form $\mathbf{C}(testSet)$
      if $\text{rank}(\mathbf{O}(\mathbf{A},\mathbf{C})) \geq maxRank$
         $maxRank = \text{rank}(\mathbf{O}(\mathbf{A},\mathbf{C}))$
         $maxTestSet = testSet$
      end
   end
      $optimalSet \leftarrow maxTestSet$
      if $maxRank = N$
         return
      end
end

SYSTEM AND METHOD FOR SELECTING MEASUREMENT NODES TO ESTIMATE AND TRACK STATE IN DYNAMIC NETWORKS

CROSS-REFERENCE TO RELATED APPLICATIONS

This application claims the benefit of and is a non-provisional patent application of U.S. Provisional Application No. 62/875,195, filed on Jul. 17, 2019, the entirety of which is hereby incorporated by reference.

GOVERNMENT RIGHTS

This invention was made with government support under U.S. Government Contract Number PC 1141899, awarded by a Government Contractor. The government has certain rights in the invention.

BACKGROUND OF INVENTION

(1) Field of Invention

The present invention relates to a state estimation system and, more particularly, to a system and method for selecting measurement nodes by determining a limited number of measurement states in a dynamical system, from which the entire system state can be reconstructed at some initial time.

(2) Description of Related Art

An ability to observe and estimate system states has many applications, resulting in a number of proposed techniques. By way of example, Kalman introduced the concept of observability in linear dynamical systems (see the List of Incorporated Literature References, Reference Nos. 1 and 3). Kalman filtering was also introduced by Kalman (see Literature Reference No. 2). Liu et al. expanded upon the previous works and were among the first to study observability and controllability in complex networks (see Literature Reference Nos. 4 and 5). Specifically, they described the use of the maximum matching algorithm to predict the minimum sensor set for observability. A problem with such existing systems is that they are slow and subject to noise. Thus, a continuing need exists for a state estimation system that allows the tracking of states in the presence of noisy measurements and process noise to provide for real-time selection of measurement nodes, full-state reconstruction using those measurement nodes, and estimation and tracking of the states over time.

SUMMARY OF INVENTION

This disclosure provides a system for selecting measurement nodes in a distributed physical system of agents. In one embodiment, the system includes one or more processors and a memory. The memory is a non-transitory computer-readable medium having executable instructions encoded thereon, such that upon execution of the instructions, the one or more processors perform operations of, including representing the distributed physical system as a multi-layer network having a communication layer and an agent layer, the communication layer representing the amount of collective communication activities between any pair of areas and the agent layer representing movement of agents within the distributed physical system such that the communication layer and agent layer collectively generate network dynamics; modeling the network dynamics as hybrid partial differential equations (PDEs) with measurable interconnected states in the communication layer; and determining placement of a minimum set of measurement nodes within the distributed physical system to provide full-state observability of the distributed physical system.

In another aspect, the hybrid PDEs are ordinary differential equations (ODEs) that are discretized in time and represented as linear state space equations of a form $x_k = A x_{k-1}$, where $x_k$ is a vector of states at time, $t_k$, and A is a state transition matrix.

In another aspect, the system reconstructs a full system state $\hat{x}_o$ at some time, $t_o$.

In yet another aspect, the system tracks the full system state from $t_o \to t_f$.

Further, n time steps are needed to reconstruct the full system state $\hat{x}_o$, such that a Kalman filter uses the full system state $\hat{x}_o$ and measurements $y_{o+1} \ldots y_{o+n-1}$ to estimate back states $\hat{x}_{o+1} \ldots \hat{x}_{o+n-1}$, such that tracking from $t_{o+n} \to t_f$ uses real-time measurements to compute future states.

Additionally, the system performs an operation of applying compensation to the one or more agents in the distributed physical system based on tracking the full system state, such as causing a device to move.

In yet another aspect, the system further performs an operation of determining vessel flow density of a given distributed physical system when only two or more agents are present in the distributed physical system.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for selecting measurement nodes and, more specifically, to a system for (i) minimal observer selection to achieve full observability in large dynamical multilayer networks, (ii) reconstruction of system state at some initial time using a set of measurements at the selected nodes, and (iii) full state estimation and tracking. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Kalman, R., 1959. On the general theory of control systems. *IRE Transactions on Automatic Control*, 4(3), pp. 110-110.
2. Kalman, R. E., 1960. A new approach to linear filtering and prediction problems. Journal of basic Engineering, 82(1), pp. 35-45.
3. Kalman, R E., 1963. Mathematical description of linear dynamical systems. *Journal of the Society for Industrial and Applied Mathematics, Series A: Control*, 1(2), pp. 152-192.
4. Liu, Y. Y., Slotine, J. J. and Barabási, A. L., 2011. Controllability of complex networks. *Nature* 473(7346), p. 167.
5. Liu, Y. Y., Slotine, J. J. and Barabási, A. L., 2013. Observability of complex systems. Proceedings of the National Academy of Sciences, 110(7), pp. 2460-2465.
6. U.S. Patent Publication No. 2018/0332256, "Coarse-Grained Multilayer Flow Information Dynamics for Multiscale Monitoring," Nov. 15, 2018.

(2) Principal Aspects

Various embodiments of the invention include three "principal" aspects. The first is a system for selecting measurement nodes to estimate and track state in dynamic networks. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
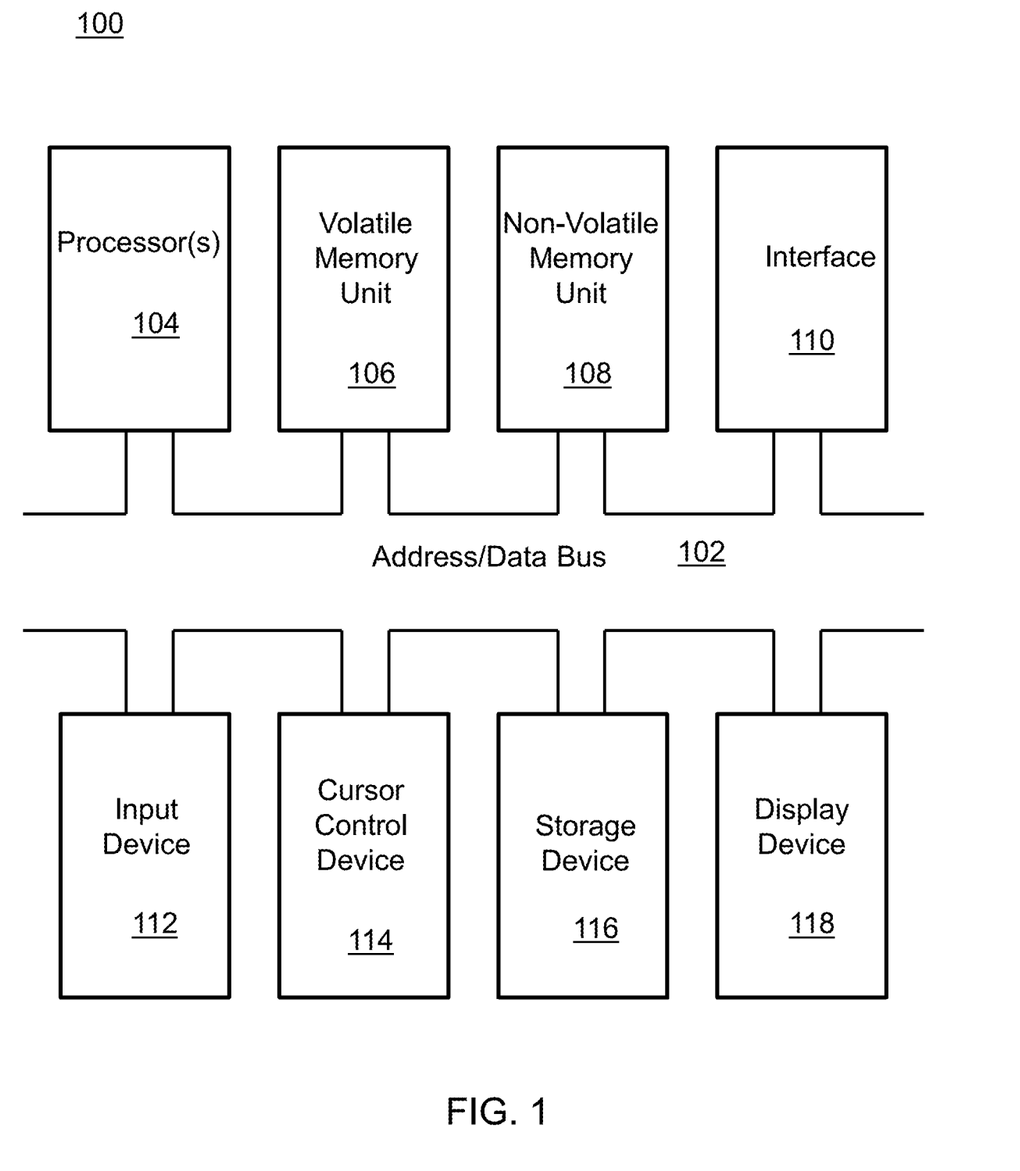
FIG. 1 is a block diagram depicting the components of a system according to various embodiments of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
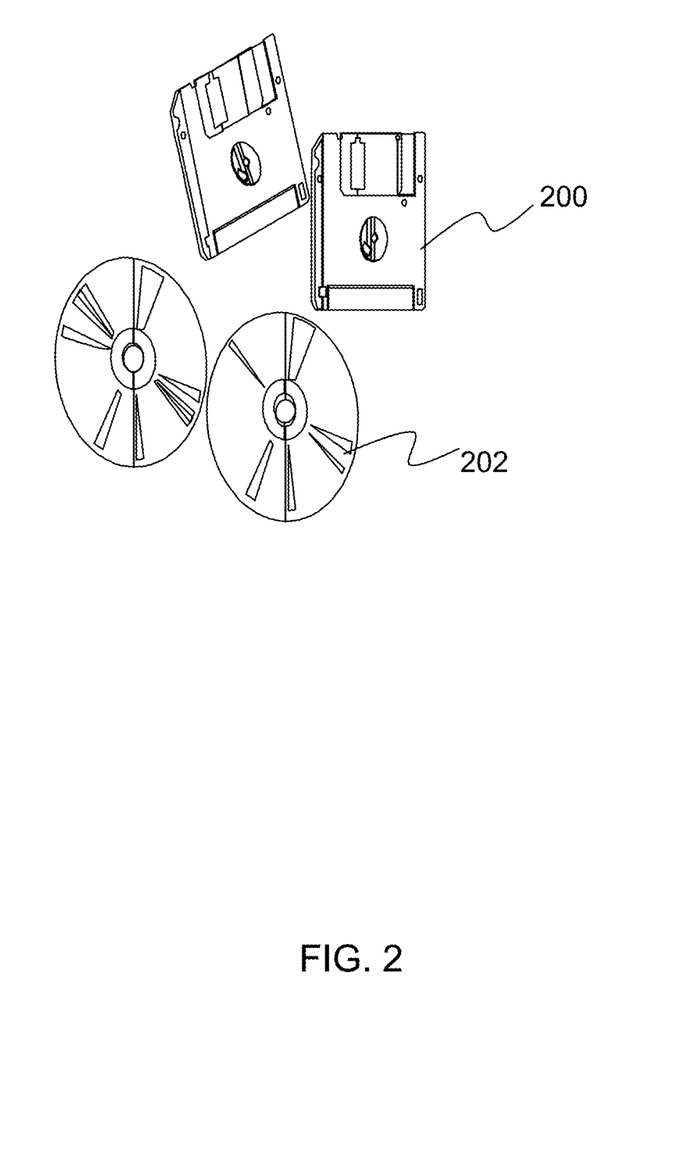
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The present disclosure describes a system and method for selecting a limited number of measurement states in a dynamical system, from which the entire system state can be reconstructed at some initial time. The method also provides a process and technique for tracking all system states over time, in the presence of measurement noise and process disturbances. The system described in the present disclosure provides a fast method for (i) minimal observer selection to achieve full observability in large dynamical multilayer networks, (ii) reconstruction of system state at some initial time using a set of measurements at the selected nodes, and (iii) full state estimation and tracking using a standard Kalman filter.

The system provides a number of unique elements that offer advantages over conventional approaches. One advantage is fast operation. For example, Liu et al. (see Literature Reference No. 5) described the use of the maximum matching algorithm to predict the minimum sensor set for observability. Alternatively, the system of the present disclosure uses a simpler heuristic algorithm, based on incremental rank maximization, for selecting the minimum sensor set for observability for general linear dynamical systems. The incorporation of Kalman filtering in the present system allows the tracking of states in the presence of noisy measurements and process noise. As can be appreciated by those skilled in the art, the ability to estimate and track states has a variety of applications. Specific details are provided below for further understanding.

(4) Specific Details of Various Embodiments

Figure 3:
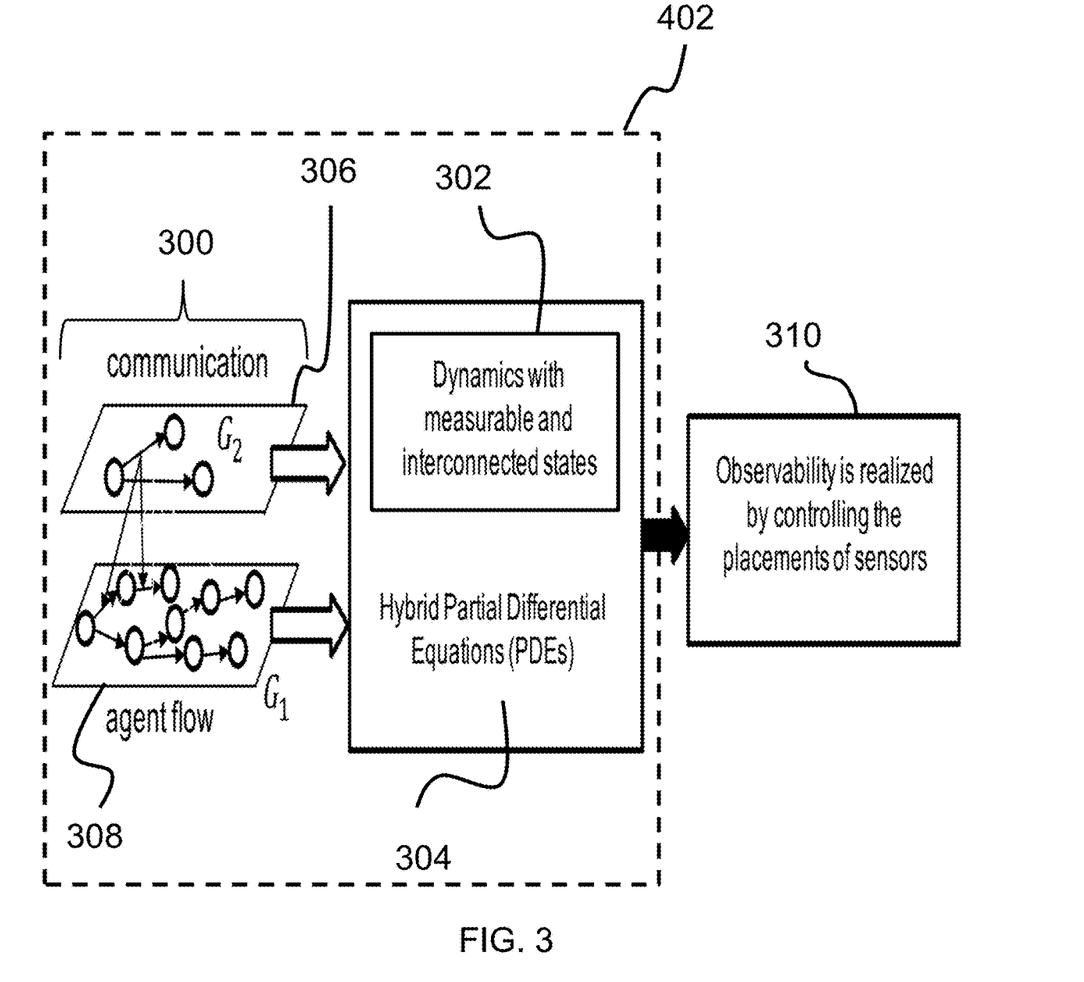
FIG. 3 is an illustration of a distributed physical system represented as a network according to various embodiments of the present invention.

As noted above, the present disclosure is directed to system and method for selecting a limited number of measurement states in a dynamical system, from which the entire system state can be reconstructed at some initial time. As shown in FIG. 3, the invention applies to a distributed physical system represented as a multilayer network 300. The network dynamics 302 are modeled as hybrid partial differential equations (PDEs) 304 with interconnected states which are measurable in the communication layer 306. The network dynamics 302 are a representation of the time evolution of a physical system; that is, how the states of the system change over time. For example, the nodes in the network may represent the movement of marine vessels at various discrete grid points on the surface of the ocean. The states of the system are the vessel flow densities (how many vessels are passing through a grid cell per unit of time) and the network dynamics describe how these states (vessel flow densities) change over time. In this disclosure, the term "hybrid PDEs" will refer to PDEs that are continuous in time and discrete in space, where graph nodes represent the spatial discretization. Since space has been discretized and time is the only independent variable, the hybrid PDEs can be described as ordinary differential equations (ODEs). Further, the ODEs can be discretized in time, specifically, represented as linear state space equations of the form $x_k = A x_{k-1}$. Based on the ODEs, the system can determine the placement 310 of a minimum set of nodes (e.g., sensors) to provide full-state observability.

Figure 4:
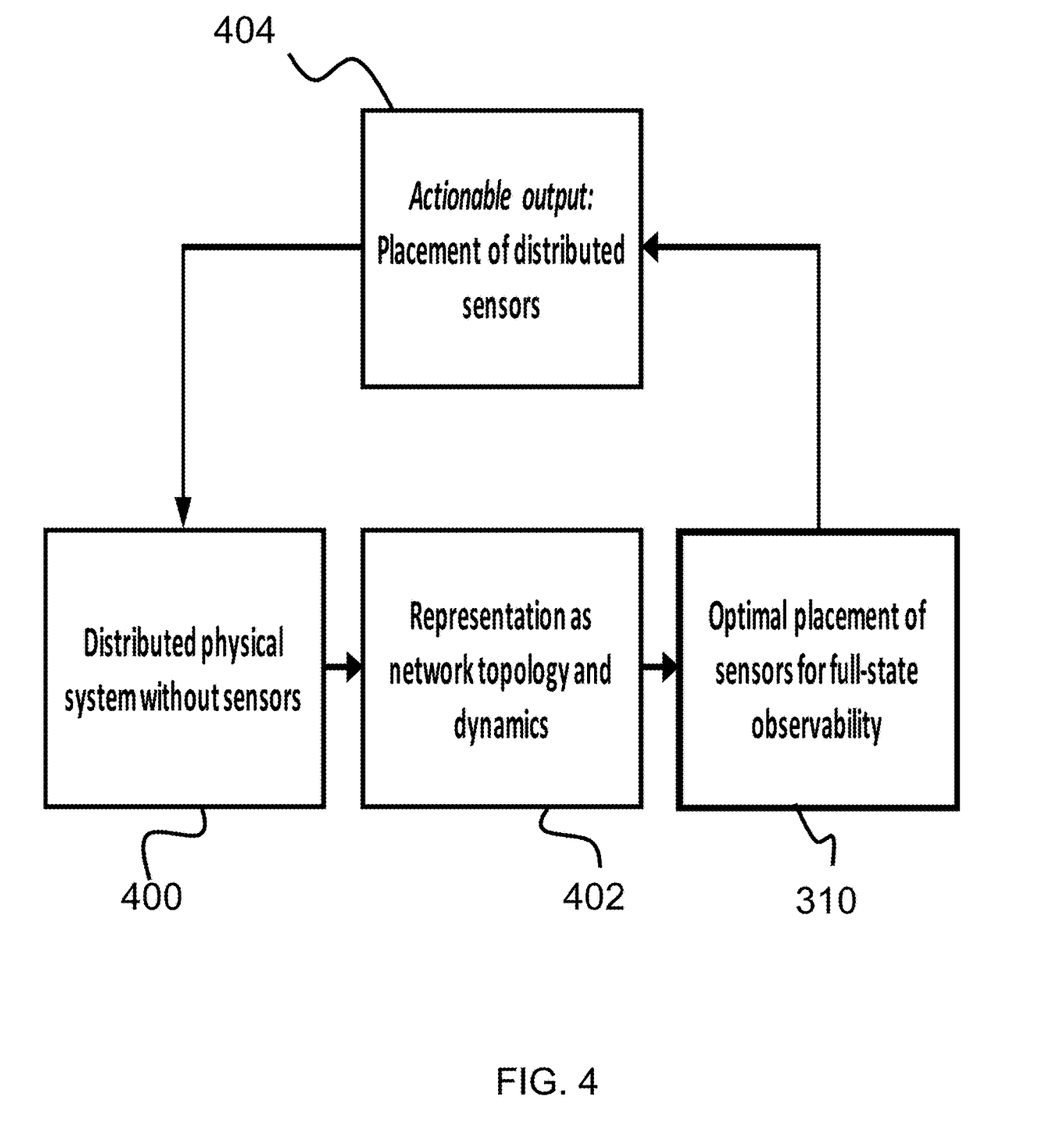
FIG. 4 is flow chart depicting placement of a minimal set of measurement nodes given a distributed physical system represented by a specific network topology and modeled by specific dynamics.

Thus, the present disclosure provides an integrated system to (i) determine a minimal set of measurement nodes (sensors) that provide full-state observability. This process is further illustrated in FIG. 4. As shown, the process determines 310 the placement of a minimal set of measurement nodes given a distributed physical system 400 represented 402 by a specific network topology and modeled by specific dynamics. An actionable output 404 is the placement of actual distributed sensors on the actual physical system.

Figure 5:
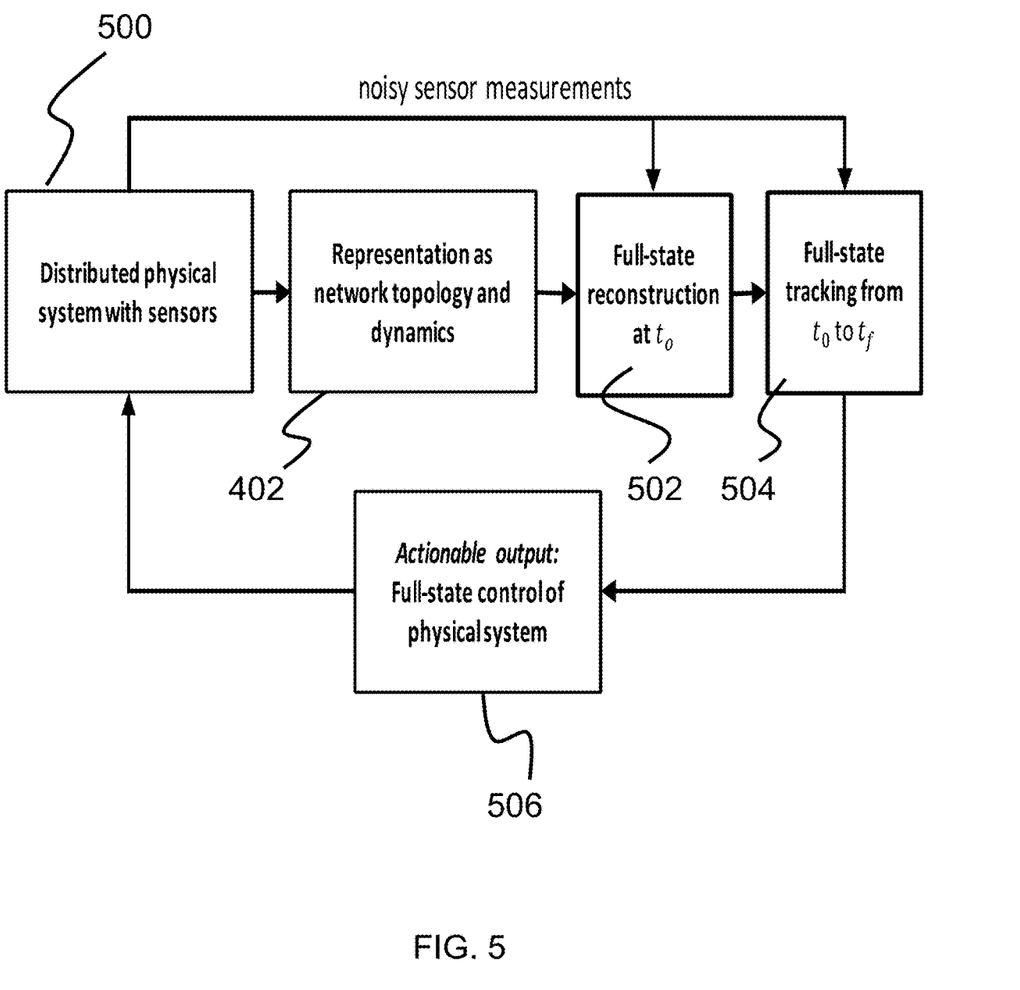
FIG. 5 is a flow chart depicting a process for reconstructing a full system state at some time, $t_o$, and estimating and tracking the full state from $t_o \to t_f$.

An output of this component of the system is the determination 310 and subsequent placement 404 of distributed sensors on the actual physical distributed system. As shown in FIG. 5, once the sensors are placed on the physical system to generate a distributed physical system with sensors 500 and the system is represented 402 by a specific network topology and modeled by specific dynamics, the invention of the present disclosure provides a method to (ii) reconstruct the full system state 502 at some time, $t_o$, and (iii) estimate and track 504 the full state, $\hat{x}_o$ from $t_o \rightarrow t_f$. The output of this component is used as input to a full state controller 506 which applies compensation to the physical system 500. For example, the full state controller 506 is a control law, $u = -K\hat{x}$, which applies compensation, u, to the physical system 500, $\dot{x} = Ax + Bu$, using the full state estimate, $\hat{x}$, provided by 504. An example of such compensation is a linear quadratic Gaussian (LQG) which combines a Kalman filter (which generates the state estimate, $\hat{x}$) together with a linear quadratic regulator (LQR, which generates the compensation, u). Applied to the movement of marine vessels, the estimate and track process 504 would estimate what the vessel flow densities are at a given time from partial measurements. Next, the state control process 506 would provide some external input (e.g. via communication to the vessels) as compensation (e.g., causing vessels to move to or away from an area, etc.) to control the vessel flow densities in some desirable way.

For further understanding, provided below is a specific non-limiting example. In this example, flow of sea-going vessels (ships) is described by the following hybrid PDE (see Literature Reference No. 6):

$$\frac{\partial V}{\partial t} = \alpha \Delta_{G_1} V + \beta \nabla_{G_2} V,$$

where the left-hand side is the rate of change of vessel density V in time t. The right-hand side of the equation has two terms: 1) diffusion of the vessels given by the graph Laplacian operator $\Delta$ with the graph $G_1$ (graph of vessel flow layer, see the agent layer 308 in FIG. 3), and 2) advection of the vessels given by the graph gradient operator $\nabla$ with the communication graph $G_2$ (graph induced by communications, see element 306 in FIG. 3). The agent layer 308 captures the movement of agents (in this example, marine vessels) in time and space (from one node to another). The term $\alpha$ is the diffusion constant and $\beta$ is the communication constant. This equation models how the communication activities affect the agent flows (in the agent layer 308) and models the agent dynamics 302 with a multilayer network. This equation is a hybrid PDE 304, because it is continuous in time and discrete in space, with the space discretization defined by the graphs $G_1$ 308 and $G_2$ 306. The discrete time setting can then be derived by linearizing the hybrid PDE in time.

In the discrete time case, the system of linear state space equations representing the physical system dynamics are, $$x_k = A x_{k-1},$$

where $x_k$ is the vector of states (vessel densities at the nodes of $G_1$ in this case) at time, $t_k$, and A is the state transition matrix, which represents the discretized dynamics of the system (vessel diffusion and advection in this case). The output measurements are, $$y_k = C x_k,$$

where C is the output matrix and $y_k$ are the measurements (of vessel densities) taken by AIS sensors at a subset of the nodes of $G_1$. If all states were being measured, then the output matrix would be the identity matrix; that is $y_k = x_k$. This, however, would require substantially greater monitoring resources (AIS sensors) than possibly needed.

To evaluate if it is possible to recover the entire system state by monitoring just a small subset of the system state, consider the concept of observability. The observability matrix is defined as, $$O(A, C) = \begin{pmatrix} C \\ CA \\ \vdots \\ CA^{n-1} \end{pmatrix}.$$

The observability matrix provides a mapping from some initial state to a set of future measurements, $$\begin{pmatrix} y_o \\ y_{o+1} \\ \vdots \\ y_{o+n-1} \end{pmatrix} = Ox_o,$$

where n is the number of states. The system can be uniquely solved for $x_o$, if and only if the observability matrix is full rank (rank(O)=n).

Figure 6A:
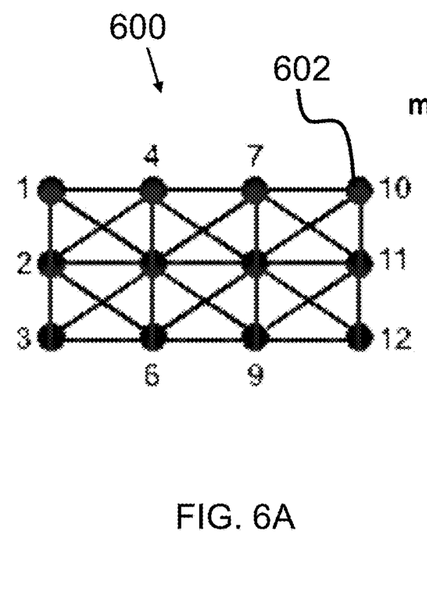
FIG. 6A is an illustration depicting a vessel flow layer, $G_1$, a 12-node grid network where each node represents a system state.

Consider a graph $G_1$ representing the vessel flow layer. In this case and as shown in FIG. 6A, the vessel flow layer is a rectangular 12-node grid 600 where each node 602 represents a system state (vessel flow density). The nodes are all connected to their nearest neighbors. This means that vessel flow can occur between any two adjacent nodes on the grid 600. The grid 600 represents a physical expanse of ocean over which vessel flow has been discretized.

Figure 6B:
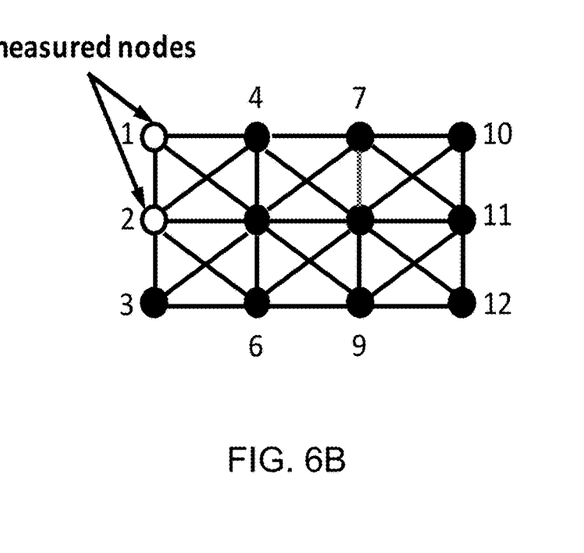
FIG. 6B is an illustration depicting the 12-node grid network shown in FIG. 6A, where the first two nodes are measured and all other nodes are unmeasured.

Alternatively and as shown in FIG. 6B, consider a situation in which MS measurements of vessel flow density are made only at the first two nodes (grid locations). In this example, all other nodes are unmeasured.

By specifying a communication graph $G_2$ (not shown here) and given the hybrid PDE, $$\frac{\partial V}{\partial t} = \alpha \Delta_{G_1} V + \beta \nabla_{G_2} V,$$

the system can generate the discrete space, discrete time state equations, $x_k = Ax_{k-1}$, by taking the graph Laplacian of $G_1$ and the graph gradient of $G_2$.

The state transition matrix, A, in this case is,

| 0.9700 | 0.0100 | 0      | 0.0100 | 0.0100 | 0      | 0      | 0      | 0      | 0      | 0      | 0      |
|--------|--------|--------|--------|--------|--------|--------|--------|--------|--------|--------|--------|
| 0.0100 | 0.9500 | 0.0100 | 0.0100 | 0.0100 | 0.0100 | 0      | 0      | 0      | 0      | 0      | 0      |
| 0      | 0.0100 | 0.8700 | 0      | 0.0100 | 0.0100 | 0      | 0      | 0      | 0      | 0      | 0      |
| 0.0100 | 0.0100 | 0      | 0.9500 | 0.0100 | 0      | 0.0100 | 0.0100 | 0      | 0      | 0      | 0      |
| 0.0100 | 0.0100 | 0.1100 | 0.0100 | 0.8200 | 0.0100 | 0.0100 | 0.0100 | 0.0100 | 0      | 0      | 0      |
| 0      | 0.0100 | 0.0100 | 0      | 0.0100 | 0.9500 | 0      | 0.0100 | 0.0100 | 0      | 0      | 0      |
| 0      | 0      | 0      | 0.0100 | 0.1100 | 0      | 0.9500 | 0.0100 | 0      | 0.0100 | 0.0100 | 0      |
| 0      | 0      | 0      | 0.0100 | 0.0100 | 0.0100 | 0.0100 | 0.9200 | 0.0100 | 0.0100 | 0.0100 | 0.0100 |
| 0      | 0      | 0      | 0      | 0.0100 | 0.0100 | 0      | 0.0100 | 0.9500 | 0      | 0.0100 | 0.0100 |
| 0      | 0      | 0      | 0      | 0      | 0      | 0.0100 | 0.0100 | 0      | 0.9700 | 0.0100 | 0      |
| 0      | 0      | 0      | 0      | 0      | 0      | 0.0100 | 0.0100 | 0.0100 | 0.0100 | 0.9500 | 0.0100 |
| 0      | 0      | 0      | 0      | 0      | 0      | 0      | 0.0100 | 0.0100 | 0      | 0.0100 | 0.9700 | and the output matrix, C, specifying measurements at only the first two nodes in the grid, is,

| 1 | 0 | 0 | 0 | 0 | 0 | 0 | 0 | 0 | 0 | 0 | 0 |
|---|---|---|---|---|---|---|---|---|---|---|---|
| 0 | 1 | 0 | 0 | 0 | 0 | 0 | 0 | 0 | 0 | 0 | 0 |

The rank of the observability matrix is rank[O(A, C)]=12=n. This implies that the 12 states at time $t_o$ can be reconstructed from AIS measurements of vessel flow density, solely at the first two grid locations.

$$x_o = \begin{pmatrix} x_1 \\ x_2 \\ \vdots \\ x_{12} \end{pmatrix}_o = (O^T O)^{-1} O^T \begin{pmatrix} y_o \\ y_{o+1} \\ \vdots \\ y_{o+11} \end{pmatrix},$$

where $(O^T O)^{-1} O^T$ is the left inverse of O.

Given measurement (sensor) noise, $v_k$, the output equation is, $$y_k = Cx_k + v_k$$

and $(O^T O)^{-1} O^T$ yields the optimal (least squares) state estimate, $$\hat{x}_o = (O^T O)^{-1} O^T \begin{pmatrix} y_o \\ y_{o+1} \\ \vdots \\ y_{o+11} \end{pmatrix}.$$

This least-squares observer yields a state estimate, $\hat{x}_o$ that minimizes the error between, (i) the output that would be observed, given state $\hat{x}_o$, with no sensor noise and, (ii) the actual observed (noisy) output.

Figure 7:
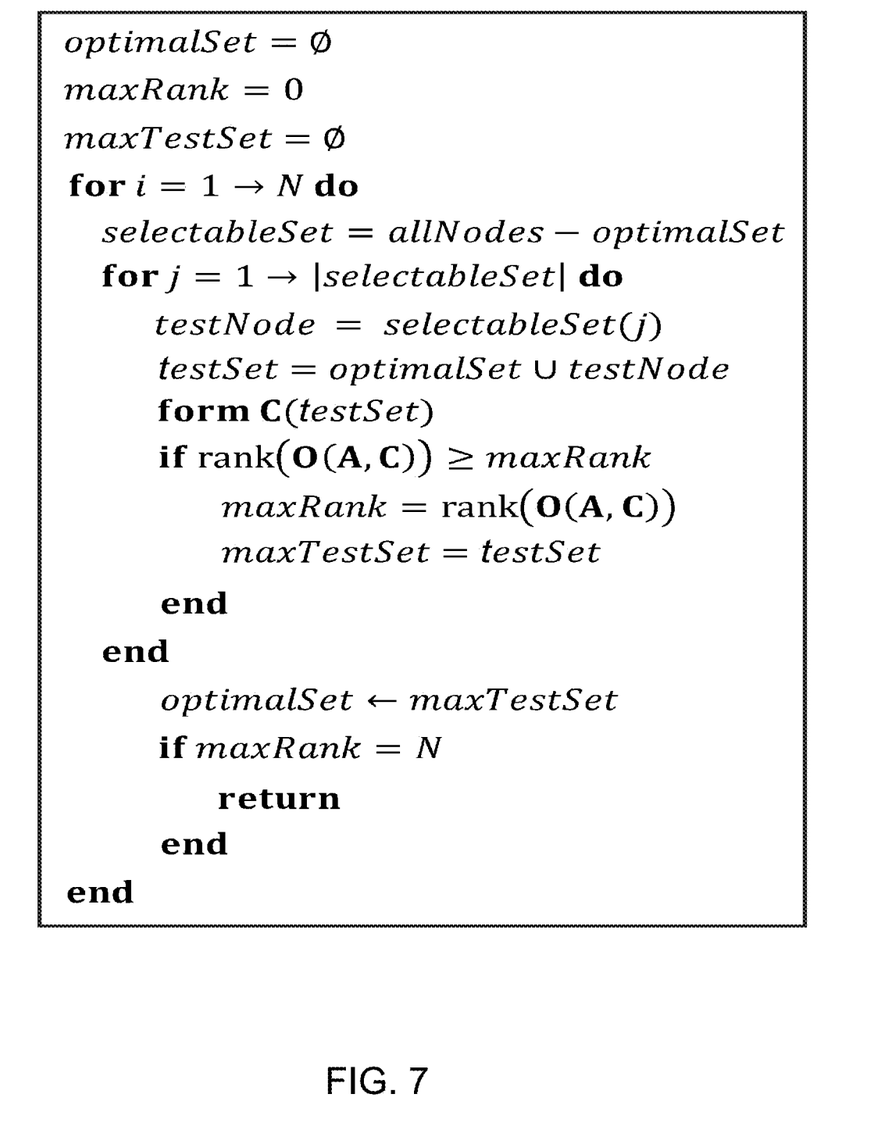
FIG. 7 is an illustration of an algorithm according to various embodiments of the present invention.

In this example, two measurement nodes are arbitrarily chosen that happened to lead to a fully observable system. In more complex cases it would be difficult to arbitrarily choose a minimal set of measurement nodes that would result in fully observability. The invention specifies an observer selection component (see element 310 in FIGS. 3 and 4). This component performs a greedy optimization to find a minimal set of nodes required to achieve full observability. This procedure is further described in FIG. 7. The process finds an optimal set of observer nodes by incrementally maximizing the rank of (A, C) in a greedy manner. Starting with the null set, the procedure incrementally adds nodes which increase the rank of the observability matrix by the greatest amount. This is repeated until full observability is reached.

Following completion of the observer selection component, the invention performs a reconstruction of the full state at $t_o$. This is performed through the computation, $$\hat{x}_o = (O^T O)^{-1} O^T \begin{pmatrix} y_o \\ y_{o+1} \\ \vdots \\ y_{o+n-1} \end{pmatrix}.$$

Following the reconstruction, $\hat{x}_o$, of the initial state, the invention implements a Kalman filter to track the full state from $t_o \rightarrow t_f$. It is noted that measurements at n time steps are needed to reconstruct, $\hat{x}_o$. Therefore, $\hat{x}_o$ only becomes available at $t_{o+n-1}$. The Kalman filter implementation in the invention, thus uses the state $\hat{x}_o$ and measurements $y_{o+1} \ldots y_{o+n-1}$ to estimate the back states $\hat{x}_{o+1} \ldots \hat{x}_{o+n-1}$. From $t_{o+n} \rightarrow t_f$ the process uses the real-time measurements to compute the states.

Given a system with process and measurement noise, $$x_k = A x_{k-1} + w_k,$$

$$y_k = C x_k + v_k,$$

where $w_k$ is zero mean normally distributed process noise (plant disturbance) with covariance Q, and $v_k$ is zero mean normally distributed measurement noise (observation error) with covariance R, the system can use a standard Kalman filter to estimate states from the measurements as follows.

$$\hat{x}_{k|k-1} = A \hat{x}_{k-1|k-1}, \quad \text{(prior state estimate)}$$

$$P_{k|k-1} = A P_{k-1|k-1} A^T + Q, \quad \text{(prior covariance estimate)}$$

$$S_k = R + C P_{k|k-1} C^T, \quad \text{(innovation covariance)}$$

$$K_k = P_{k|k-1} C^T S_k^{-1}, \quad \text{(Kalman gain)}$$

$$\hat{x}_{k|k} = \hat{x}_{k|k-1} + K_k (y_k - C \hat{x}_{k|k-1}), \quad \text{(posterior state estimate)}$$

In conjunction with the least-squares observer for computing the initial state, this allows the system to compute the entire state history using noisy measurements from a subset of nodes.

(5) Example Practical Applications

The representation of complex physical systems using graph theoretic approaches is fundamental to efficiently analyzing these systems. As can be appreciated by those skilled in the art, the development of real-time estimation and control for complex cyber physical networks has several applications. For example, in the commercial sector, the system can be used in autonomous driving where the method of the present disclosure addresses a significant challenge in state estimation and control of large-scale vehicle-vehicle networks (where each vehicle is an agent or node in the network). Other applications include a new generation of autonomous air, sea and land vehicles that work together more effectively as a team or unit (i.e., multi-agent system). This allows for state estimation of complex cyber physical networks. These networks can represent the coordinated operation of a wide variety of multi-agent systems.

Figure 8:
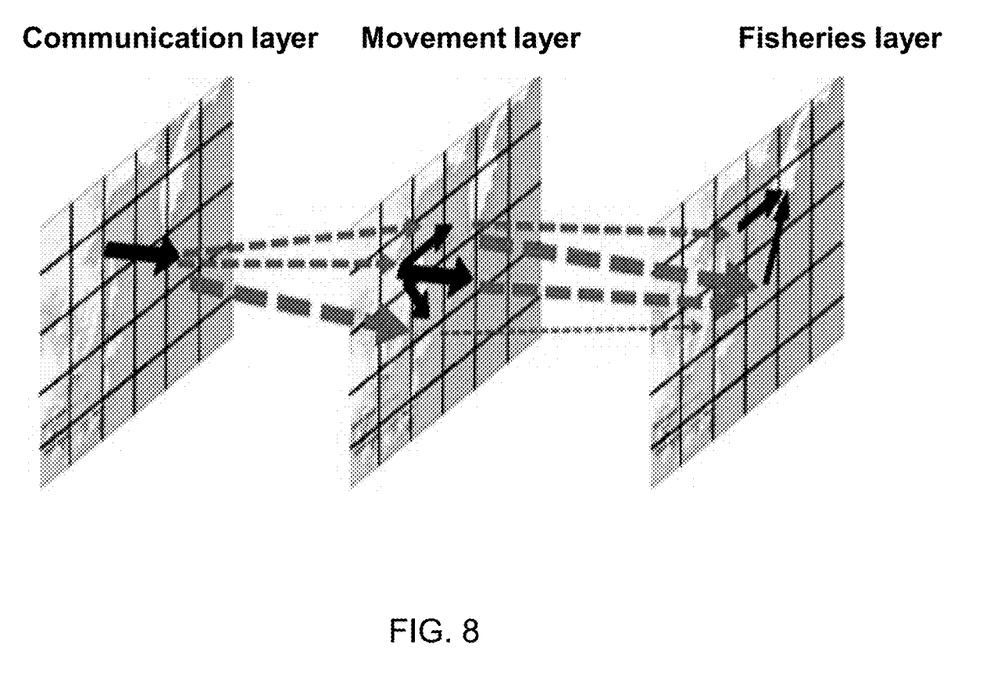
FIG. 8 is an illustration depicting an example implementation, in which vessel flow and communication dynamics can be represented as a multilayer graph.

As a specific non-limiting example, consider the use case of illegal, unregulated, and unreported fishing in contested waters. Monitoring sources for determining the flow of fishing vessels may include satellite, terrestrial, and ocean buoy Automatic Identification Systems (AIS), as well as ship-to-ship/ship-to-shore communications (Twitter, port authority logs, etc.). A ship that is not communicating at times when it typically would and is exhibiting AIS tracks that indicate fishing, could be detected and flagged for further observation. For example, the vessel flow and communication dynamics can be represented as a multilayer graph as shown in FIG. 8. The system would provide a technique for selecting a minimal set of monitoring nodes (e.g. satellites, ocean buoys) to achieve full observability of the system (e.g., maritime activity network) and tracking over time. Thus, the system could apply compensation to the one or more agents in the distributed physical system based on tracking the full system state. As an example, the system could cause nodes to move or otherwise operate in a manner to allow for observability of the relevant area. This would allow tracking of vessel flow and detection of targeted activities like illegal fishing with a minimal set of monitoring resources.

Figure 9:
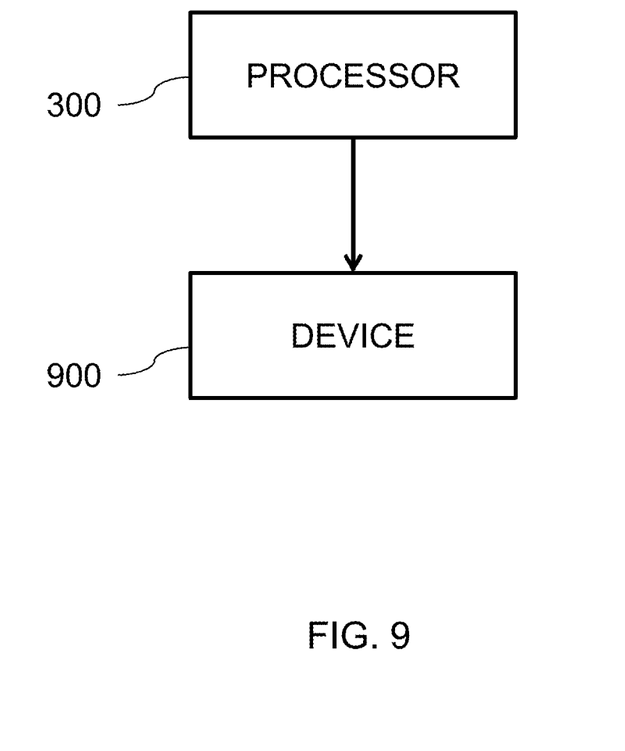
FIG. 9 is a block diagram depicting control of a device according to various embodiments.

It should be noted that this invention is applicable to other use cases beyond maritime activity monitoring and is applicable to any physical system that can be represented as a dynamic distributed network (a network with states that evolve over time with spatially distributed nodes). For example and as shown in FIG. 9, a processor 104 may be used to control a node 900 (e.g., an autonomous vehicle, satellite a drone, a camera, etc.) based on selecting a minimal set of monitoring nodes 900 (e.g., an autonomous vehicle, satellite a drone, a camera, etc.) to achieve full observability of the system and tracking over time. Again, controlling the node 900 is an example of applying compensation to the one or more agents in the distributed physical system based on tracking the full system state. The control of the node 900 may be used to cause the associated device (e.g., drone, autonomous vehicle, camera, etc.) to move or otherwise initiate a physical action (i.e., apply compensation) based on the selection and tracking.

In some embodiments, a drone or other autonomous vehicle may be controlled to move to an area where the localization of the object is determined to be based on the imagery. In yet some other embodiments, a camera may be controlled to orient towards the localization and track a particular target object or activity. In other words, actuators or motors are activated to cause the camera (or sensor) to move or zoom in on the target object and follow the target object. In yet another aspect, if a system is seeking a particular object and if the object is not determined to be within the field-of-view of the camera after the discrimination process, the camera can be caused to rotate or turn to view other areas within a scene until the sought after object is detected.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for selecting measurement nodes in a distributed physical system of agents, the system comprising:
one or more processors and a memory, the memory being a non-transitory computer-readable medium having executable instructions encoded thereon, such that upon execution of the instructions, the one or more processors perform operations of:
representing the distributed physical system as a multi-layer network having a communication layer and an agent layer, the communication layer representing an amount of collective communication activities between any pair of areas and the agent layer representing movement of agents within the distributed physical system such that the communication layer and agent layer collectively generate network dynamics;
modeling the network dynamics as hybrid partial differential equations (PDEs) with measurable interconnected states in the communication layer; and determining placement of a minimum set of measurement nodes within the distributed physical system to provide full-state observability of the distributed physical system.

2. The system as set forth in claim 1, wherein the hybrid PDEs are ordinary differential equations (ODEs) that are discretized in time and represented as linear state space equations of a form $x_k = A x_{k-1}$, where $x_k$ is a vector of states at time, $t_k$, and A is a state transition matrix.

3. The system as set forth in claim 2, further comprising an operation of reconstructing a full system state $\hat{x}_o$ at some time, $t_o$.

4. The system as set forth in claim 3, further comprising an operation of tracking the full system state from $t_o \rightarrow t_f$.

5. The system as set forth in claim 4, wherein n time steps are needed to reconstruct the full system state $\hat{x}_o$, such that a Kalman filter uses the full system state $\hat{x}_o$ and measurements $y_{o+1} \ldots y_{o+n-1}$ to estimate back states $\hat{x}_{o+1} \ldots \hat{x}_{o+n-1}$, such that tracking from $t_{o+n} \rightarrow t_f$ uses real-time measurements to compute future states.

6. The system as set forth in claim 5, further comprising an operation of applying compensation to the one or more agents in the distributed physical system based on tracking the full system state.

7. The system as set forth in claim 4, further comprising an operation of applying compensation to the one or more agents in the distributed physical system based on tracking the full system state.

8. The system as set forth in claim 7, wherein applying compensation includes causing a device to move.

9. The system as set forth in claim 1, further comprising an operation of determining vessel flow density of a given distributed physical system when only two or more agents are present in the distributed physical system.

10. A computer program product for selecting measurement nodes in a distributed physical system of agents, the computer program product comprising:
a non-transitory computer-readable medium having executable instructions encoded thereon, such that upon execution of the instructions by one or more processors, the one or more processors perform operations of:
representing the distributed physical system as a multi-layer network having a communication layer and an agent layer, the communication layer representing an amount of collective communication activities between any pair of areas and the agent layer representing movement of agents within the distributed physical system such that the communication layer and agent layer collectively generate network dynamics;
modeling the network dynamics as hybrid partial differential equations (PDEs) with measurable interconnected states in the communication layer; and
determining placement of a minimum set of measurement nodes within the distributed physical system to provide full-state observability of the distributed physical system.

11. The computer program product as set forth in claim 10, wherein the hybrid PDEs are ordinary differential equations (ODEs) that are discretized in time and represented as linear state space equations of a form $x_k = A x_{k-1}$, where $x_k$ is a vector of states at time, $t_k$, and A is a state transition matrix.

12. The computer program product as set forth in claim 11, further comprising an operation of reconstructing a full system state $\hat{x}_0$, at some time, $t_o$.

13. The computer program product as set forth in claim 12, further comprising an operation of tracking the full system state from $t_o \rightarrow t_f$.

14. The computer program product as set forth in claim 13, wherein n time steps are needed to reconstruct the full system state such that a Kalman filter uses the full system state $\hat{x}_o$ and measurements $y_{o+1} \ldots y_{o+n-1}$ to estimate back states $\hat{x}_{o+1} \ldots \hat{x}_{o+n-1}$, such that tracking from $t_{o+n} \rightarrow t_f$ uses real-time measurements to compute future states.

15. The computer program product as set forth in claim 14, further comprising an operation of applying compensation to the one or more agents in the distributed physical system based on tracking the full system state.

16. The computer program product as set forth in claim 13, further comprising an operation of applying compensation to the one or more agents in the distributed physical system based on tracking the full system state.

17. The computer program product as set forth in claim 16, wherein applying compensation includes causing a device to move.

18. The computer program product as set forth in claim 10, further comprising an operation of determining vessel flow density of a given distributed physical system when only two or more agents are present in the distributed physical system.

19. A computer implemented method for selecting measurement nodes in a distributed physical system of agents, the method comprising an act of:
causing one or more processors to execute instructions encoded on a nontransitory computer-readable medium, such that upon execution, the one or more processors perform operations of:
representing the distributed physical system as a multi-layer network having a communication layer and an agent layer, the communication layer representing an amount of collective communication activities between any pair of areas and the agent layer representing movement of agents within the distributed physical system such that the communication layer and agent layer collectively generate network dynamics;
modeling the network dynamics as hybrid partial differential equations (PDEs) with measurable interconnected states in the communication layer; and
determining placement of a minimum set of measurement nodes within the distributed physical system to provide full-state observability of the distributed physical system.

20. The method as set forth in claim 19, wherein the hybrid PDEs are ordinary differential equations (ODEs) that are discretized in time and represented as linear state space equations of a form $x_k = A x_{k-1}$, where $x_k$ is a vector of states at time, $t_k$, and A is a state transition matrix.

21. The method as set forth in claim 20, further comprising an operation of reconstructing a full system state $\hat{x}_o$ at some time, $t_o$.

22. The method as set forth in claim 21, further comprising an operation of tracking the full system state from $t_o \rightarrow t_f$.

23. The method as set forth in claim 22, wherein n time steps are needed to reconstruct the full system state $\hat{x}_o$, such that a Kalman filter uses the full system state $\hat{x}_o$ and measurements $y_{o+1} \ldots y_{o+n-1}$ to estimate back states $\hat{x}_{o+1} \ldots \hat{x}_{o+n-1}$, such that tracking from $t_{o+n} \rightarrow t_f$ uses real-time measurements to compute future states.

24. The method as set forth in claim 23, further comprising an operation of applying compensation to the one or more agents in the distributed physical system based on tracking the full system state.

25. The method as set forth in claim 22, further comprising an operation of applying compensation to the one or more agents in the distributed physical system based on tracking the full system state.

26. The method as set forth in claim 25, wherein applying compensation includes causing a device to move.

27. The method as set forth in claim 19, further comprising an operation of determining vessel flow density of a given distributed physical system when only two or more agents are present in the distributed physical system.

* * * * *